US008919113B2

(12) United States Patent
Ma et al.

(10) Patent No.: US 8,919,113 B2
(45) Date of Patent: Dec. 30, 2014

(54) HYDRAULIC CONTROL SYSTEM HAVING ENERGY RECOVERY KIT

(75) Inventors: Pengfei Ma, Naperville, IL (US); Jiao Zhang, Naperville, IL (US); Tonglin Shang, Bolingbrook, IL (US); Peter Spring, Montgomery, IL (US); Dayao Chen, Bolingbrook, IL (US); Salik A. Syed, Aurora, IL (US); John Ferraz, Jr., Romeoville, IL (US); Randal N. Peterson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 716 days.

(21) Appl. No.: 13/170,960

(22) Filed: Jun. 28, 2011

(65) Prior Publication Data

US 2013/0000094 A1 Jan. 3, 2013

(51) Int. Cl.

| | |
|---|---|
| ***F16D 31/02*** | (2006.01) |
| ***E02F 9/22*** | (2006.01) |
| ***E02F 9/12*** | (2006.01) |
| ***F15B 21/14*** | (2006.01) |
| ***F15B 1/02*** | (2006.01) |

(52) U.S. Cl.

CPC ....... *E02F 9/123* (2013.01); *F15B 2211/50527* (2013.01); *F15B 2211/88* (2013.01); *E02F 9/2296* (2013.01); *F15B 2211/7058* (2013.01); *E02F 9/2217* (2013.01); *F15B 2211/212* (2013.01); *F15B 2211/30575* (2013.01); *F15B 2211/613* (2013.01); *F15B 21/14* (2013.01); *F15B 1/02* (2013.01)

USPC .................................. 60/414; 60/416; 60/458

(58) Field of Classification Search

USPC .................................... 60/414, 416, 458, 464

See application file for complete search history.

(56) References Cited

U.S. PATENT DOCUMENTS

| | | | |
|---|---|---|---|
| 2,470,778 | A | 5/1949 | Lankovski et al. |
| 4,665,697 | A | 5/1987 | Dantlgraber |
| 4,757,685 | A | 7/1988 | Burckhartzmeyer |
| 5,067,321 | A | 11/1991 | Miyaoka |
| 5,197,864 | A | 3/1993 | Lunzman et al. |
| 5,424,623 | A | 6/1995 | Allen et al. |
| 5,520,087 | A | 5/1996 | Takamura et al. |
| 5,575,148 | A | 11/1996 | Hirata et al. |
| 5,622,226 | A | 4/1997 | Hausman et al. |
| 5,630,316 | A | 5/1997 | Itsuji et al. |
| 5,692,377 | A | 12/1997 | Moriya et al. |

(Continued)

FOREIGN PATENT DOCUMENTS

| | | |
|---|---|---|
| GB | 889893 | 9/1960 |
| JP | 56-090159 | 7/1981 |

(Continued)

OTHER PUBLICATIONS

U.S. Patent Application of Pengfei Ma et al. "Hydraulic Control System Having Swing Energy Recovery" filed on Jun. 30, 2011.

(Continued)

*Primary Examiner* — Michael Leslie

(74) *Attorney, Agent, or Firm* — Finnegan, Henderson, Farabow, Garrett & Dunner LLP

(57) ABSTRACT

An energy recovery retrofit kit for a hydraulic control system is disclosed. The energy recover retrofit kit may have a first accumulator and a second accumulator. The energy recover retrofit kit may also have a recovery valve block fluidly connectable between an existing pump and an existing motor of the hydraulic system. The recovery valve block may be configured to selectively fluidly communicate the first and second accumulators with the existing motor.

13 Claims, 3 Drawing Sheets

(56) References Cited

U.S. PATENT DOCUMENTS

| | | | |
|---|---|---|---|
| 5,955,706 | A | 9/1999 | Fonkalsrud et al. |
| 6,009,708 | A | 1/2000 | Miki et al. |
| 6,058,343 | A | 5/2000 | Orbach et al. |
| 6,094,911 | A | 8/2000 | Crawshaw |
| 6,151,894 | A | 11/2000 | Endo et al. |
| 6,275,757 | B1 | 8/2001 | Watanabe et al. |
| 6,393,838 | B1 | 5/2002 | Moriya et al. |
| 6,406,271 | B1 | 6/2002 | Valentin |
| 6,705,079 | B1 | 3/2004 | Tabor et al. |
| 6,892,102 | B1 | 5/2005 | Fushimi |
| 6,971,463 | B2 | 12/2005 | Shore et al. |
| 6,981,371 | B2 | 1/2006 | Imanishi et al. |
| 7,059,125 | B2 | 6/2006 | Oka et al. |
| 7,059,126 | B2 | 6/2006 | Ma |
| 7,079,931 | B2 | 7/2006 | Sahm et al. |
| 7,121,189 | B2 | 10/2006 | Vonderwell et al. |
| 7,124,576 | B2 | 10/2006 | Cherney et al. |
| 7,165,950 | B2 | 1/2007 | Fenny et al. |
| 7,260,931 | B2 | 8/2007 | Egelja et al. |
| 7,269,944 | B2 | 9/2007 | Zhang |
| 7,296,404 | B2 | 11/2007 | Pfaff |
| 7,392,653 | B2 | 7/2008 | Sugano |
| 7,487,707 | B2 | 2/2009 | Pfaff et al. |
| 7,596,893 | B2 | 10/2009 | Tozawa et al. |
| 7,698,891 | B2 | 4/2010 | Haramoto et al. |
| 7,748,279 | B2 | 7/2010 | Budde et al. |
| 7,823,379 | B2 | 11/2010 | Hamkins et al. |
| 7,908,852 | B2 | 3/2011 | Zhang et al. |
| 7,934,329 | B2 | 5/2011 | Mintah et al. |
| 7,979,181 | B2 | 7/2011 | Clark et al. |
| 8,020,583 | B2 | 9/2011 | Christensen et al. |
| 2004/0055455 | A1 | 3/2004 | Tabor et al. |
| 2005/0081518 | A1 | 4/2005 | Ma et al. |
| 2007/0044647 | A1 | 3/2007 | Kussel |
| 2007/0199604 | A1 | 8/2007 | Haugaard |
| 2009/0031720 | A1 | 2/2009 | Son |
| 2009/0217653 | A1 | 9/2009 | Zhang et al. |
| 2009/0228394 | A1 | 9/2009 | Mintah et al. |
| 2010/0024411 | A1 | 2/2010 | Payne et al. |
| 2010/0332061 | A1 | 12/2010 | Forslow et al. |
| 2011/0030644 | A1 | 2/2011 | Rentschler et al. |
| 2011/0302914 | A1 | 12/2011 | Helbling |
| 2012/0089280 | A1 | 4/2012 | Onsager et al. |
| 2013/0000289 | A1 | 1/2013 | Zhang |
| 2013/0000290 | A1 | 1/2013 | Zhang |
| 2013/0004278 | A1 | 1/2013 | Ma |
| 2013/0004280 | A1 | 1/2013 | Zhang |

FOREIGN PATENT DOCUMENTS

| | | |
|---|---|---|
| JP | 56-131802 | 10/1981 |
| JP | 60-215103 | 10/1985 |
| JP | 63-067403 | 3/1988 |
| JP | 63-167171 | 7/1988 |
| JP | 02-43419 | 2/1990 |
| JP | 03-69861 | 3/1991 |
| JP | 05-287774 | 11/1993 |
| JP | 06018670 | 3/1994 |
| JP | 09217702 | 8/1997 |
| JP | 10-103112 | 4/1998 |
| JP | 2000-213644 | 8/2000 |
| JP | 2004-125094 | 4/2004 |
| JP | 2005-003183 | 1/2005 |
| JP | 2008075568 | 4/2008 |
| JP | 2009084832 | 4/2009 |
| JP | 2010106487 | 5/2010 |
| JP | 2010203036 | 9/2010 |
| KR | 1020100053665 | 5/2010 |

OTHER PUBLICATIONS

U.S. Patent Application of Jiao Zhang et al. "Hydraulic Control System Having Swing Motor Energy Recovery" filed on Jun. 30, 2011.

U.S. Patent Application of Jiao Zhang et al. "Energy Recovery System Having Accumulator and Variable Relief" filed on Jun. 30, 2011.

U.S. Appl. No. 13/718,938 of Rustu Cesur et al. entitled "Hydraulic Control System Having Electronic Flow Limiting" filed Dec. 18, 2012.

U.S. Appl. No. 13/718,922 of Jiao Zhang et al. entitled "Hydraulic Control System Having Swing Motor Energy Recovery" filed Dec. 18, 2012.

U.S. Appl. No. 13/718,855 of Bryan J. Hillman et al. entitled "Hydraulic Control System Having Swing Motor Energy Recovery" filed Dec. 18, 2012.

U.S. Appl. No. 13/718,882 of Jiao Zhang et al. entitled "Hydraulic Control System Having Swing Motor Energy Recovery" filed Dec. 18, 2012.

U.S. Appl. No. 13/714,064 of Tonglin Shang et al. entitled "Hydraulic Control System Having Swing Oscillation Dampening" filed Dec. 13, 2012.

U.S. Appl. No. 13/714,017 of Randal N. Peterson et al. entitled "Hydraulic Control System Having Over-Pressure Protection" filed Dec. 13, 2012.

U.S. Appl. No. 13/713,988 of Rustu Cesur et al. entitled "Adaptive Work Cycle Control System" filed Dec. 13, 2012.

U.S. Appl. No. 13/170,960 of Pengfei Ma et al. entitled "Hydraulic Control System Having Energy Recovery Kit" filed Jun. 28, 2011.

U.S. Appl. No. 13/171,007 of Pengfei Ma et al. entitled "Hydraulic Control System Having Swing Energy Recovery" filed Jun. 28, 2011.

U.S. Appl. No. 13/171,047 of Jiao Zhang et al. entitled "Hydraulic Control System Having Swing Motor Energy Recovery" filed Jun. 28, 2011.

U.S. Appl. No. 13/171,110 of Jiao Zhang et al. entitled "Hydraulic Control System Having Swing Motor Energy Recovery" filed Jun. 28, 2011.

U.S. Appl. No. 13/171,146 of Jiao Zhang et al. entitled "Energy Recovery System Having Accumulator and Variable Relief" filed Jun. 28, 2011.

HYDRAULIC CONTROL SYSTEM HAVING ENERGY RECOVERY KIT

TECHNICAL FIELD

The present disclosure relates generally to a hydraulic control system and, more particularly, to a hydraulic control system having an energy recovery kit for retrofitting an existing machine.

BACKGROUND

Swing-type excavation machines, for example hydraulic excavators and front shovels, require significant hydraulic pressure and flow to transfer material from a dig location to a dump location. These machines direct high-pressure fluid from an engine-driven pump through a swing motor to accelerate a loaded work tool at the start of each swing, and then restrict the flow of fluid exiting the motor at the end of each swing to slow and stop the work tool.

One problem associated with this type of hydraulic arrangement involves efficiency. In particular, the fluid exiting the swing motor at the end of each swing still is under a relatively high pressure due to deceleration of the loaded work tool. Unless recovered, energy associated with the high-pressure fluid may be wasted. In addition, restriction of this high-pressure fluid exiting the swing motor at the end of each swing can result in heating of the fluid, which must be accommodated with an increased cooling capacity of the machine.

One attempt to improve the efficiency of a swing-type machine is disclosed in U.S. Pat. No. 7,908,852 of Zhang et al. that issued on Mar. 22, 2011 (the '852 patent). The '852 patent discloses a hydraulic control system for a machine that includes an accumulator. The accumulator stores exit oil from a swing motor that has been pressurized by inertia torque applied on the moving swing motor by an upper structure of the machine. The pressurized oil in the accumulator is then selectively reused to accelerate the swing motor during a subsequent swing by supplying the accumulated oil back to the swing motor.

Although the hydraulic control system of the '852 patent may help to improve efficiencies of a swing-type machine, it may still be less than optimal. In particular, during discharge of the accumulator described in the '852 patent, some pressurized fluid exiting the swing motor may still have useful energy that is wasted. In addition, there may be situations during operation of the hydraulic control system of the '852 patent, for example during deceleration and accumulator charging, when a pump output is unable to supply fluid at a rate sufficient to prevent cavitation in the swing motor. Further, the hydraulic control system of the '852 patent may not be configured for retrofit to an existing machine.

The disclosed hydraulic control system is directed to overcoming one or more of the problems set forth above and/or other problems of the prior art.

SUMMARY

One aspect of the present disclosure is directed to an energy recovery retrofit kit for a hydraulic control system. The energy recovery retrofit kit may include a first accumulator and a second accumulator. The energy recover retrofit kit may also include a recovery valve block fluidly connectable between an existing pump and an existing motor of the hydraulic system. The recovery valve block may be configured to selectively fluidly communicate the first and second accumulators with the existing motor.

Another aspect of the present disclosure is directed to a method of retrofitting an existing hydraulic control system with an energy recovery kit. The method may include disconnecting an existing motor from an existing control valve block, connecting a recovery valve block to the existing control valve block, and connecting the existing motor to the recovery valve block. The method may further include connecting a first accumulator to the recovery valve block, and connecting a second accumulator to an existing return line of the existing motor.

DETAILED DESCRIPTION

Figure 1:
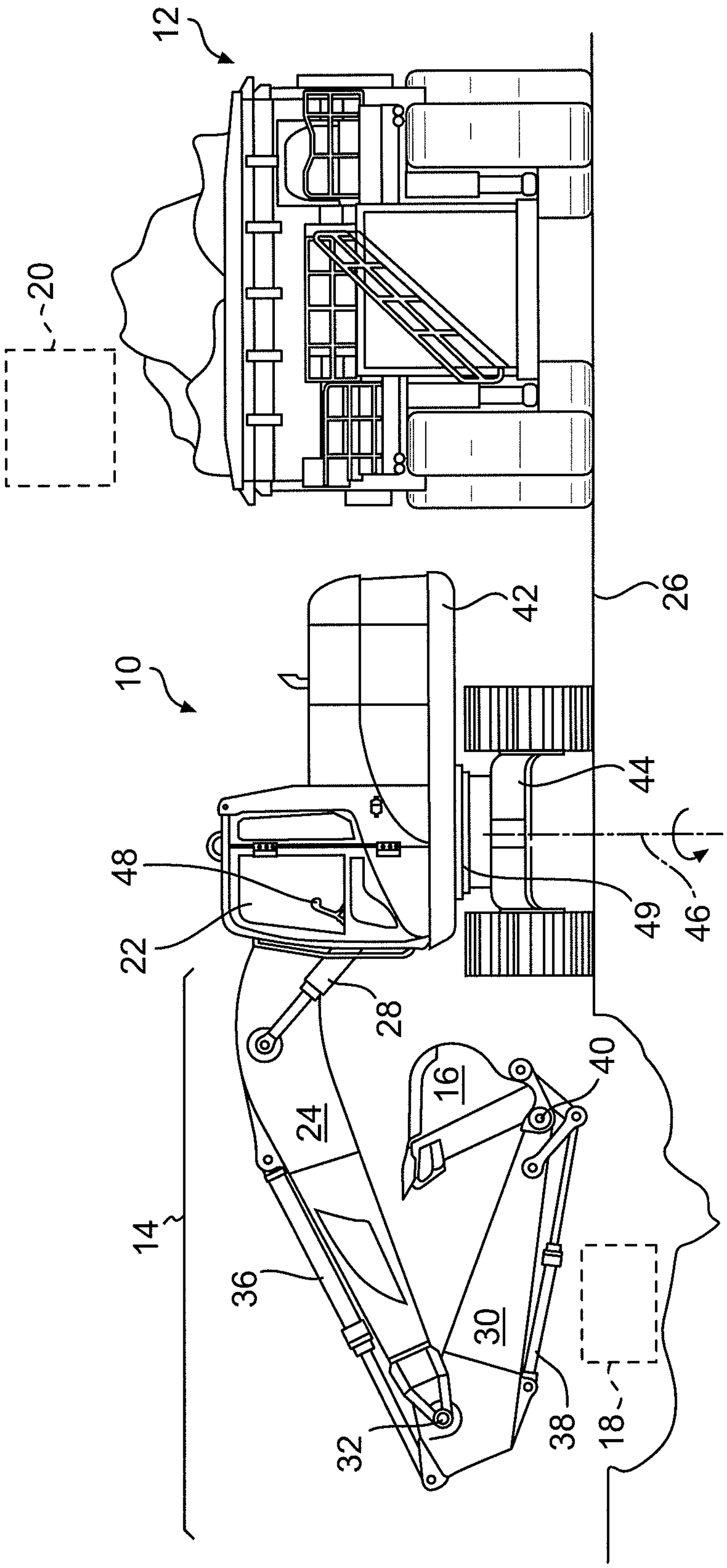
FIG. 1 is a diagrammatic illustration of an exemplary disclosed machine operating at a worksite with a haul vehicle.

FIG. 1 illustrates an exemplary machine 10 having multiple systems and components that cooperate to excavate and load earthen material onto a nearby haul vehicle 12. In one example, machine 10 may embody a hydraulic excavator. It is contemplated, however, that machine 10 may embody another swing-type excavation or material handling machine such as a backhoe, a front shovel, a dragline excavator, or another similar machine. Machine 10 may include, among other things, an implement system 14 configured to move a work tool 16 between a dig location 18 within a trench or at a pile, and a dump location 20, for example over haul vehicle 12. Machine 10 may also include an operator station 22 for manual control of implement system 14. It is contemplated that machine 10 may perform operations other than truck loading, if desired, such as craning, trenching, and material handling.

Implement system 14 may include a linkage structure acted on by fluid actuators to move work tool 16. Specifically, implement system 14 may include a boom 24 that is vertically pivotal relative to a work surface 26 by a pair of adjacent, double-acting, hydraulic cylinders 28 (only one shown in FIG. 1). Implement system 14 may also include a stick 30 that is vertically pivotal about a horizontal pivot axis 32 relative to boom 24 by a single, double-acting, hydraulic cylinder 36. Implement system 14 may further include a single, double-acting, hydraulic cylinder 38 that is operatively connected to work tool 16 to tilt work tool 16 vertically about a horizontal pivot axis 40 relative to stick 30. Boom 24 may be pivotally connected to a frame 42 of machine 10, while frame 42 may be pivotally connected to an undercarriage member 44 and swung about a vertical axis 46 by a swing motor 49. Stick 30 may pivotally connect work tool 16 to boom 24 by way of pivot axes 32 and 40. It is contemplated that a greater or lesser number of fluid actuators may be included within implement system 14 and connected in a manner other than described above, if desired.

Numerous different work tools 16 may be attachable to a single machine 10 and controllable via operator station 22. Work tool 16 may include any device used to perform a particular task such as, for example, a bucket, a fork arrangement, a blade, a shovel, or any other task-performing device known in the art. Although connected in the embodiment of FIG. 1 to lift, swing, and tilt relative to machine 10, work tool 16 may alternatively or additionally rotate, slide, extend, or move in another manner known in the art.

Operator station 22 may be configured to receive input from a machine operator indicative of a desired work tool movement. Specifically, operator station 22 may include one or more input devices 48 embodied, for example, as single or multi-axis joysticks located proximal an operator seat (not shown). Input devices 48 may be proportional-type controllers configured to position and/or orient work tool 16 by producing a work tool position signal that is indicative of a desired work tool speed and/or force in a particular direction. The position signal may be used to actuate any one or more of hydraulic cylinders 28, 36, 38 and/or swing motor 49. It is contemplated that different input devices may alternatively or additionally be included within operator station 22 such as, for example, wheels, knobs, push-pull devices, switches, pedals, and other operator input devices known in the art.

Figure 2:
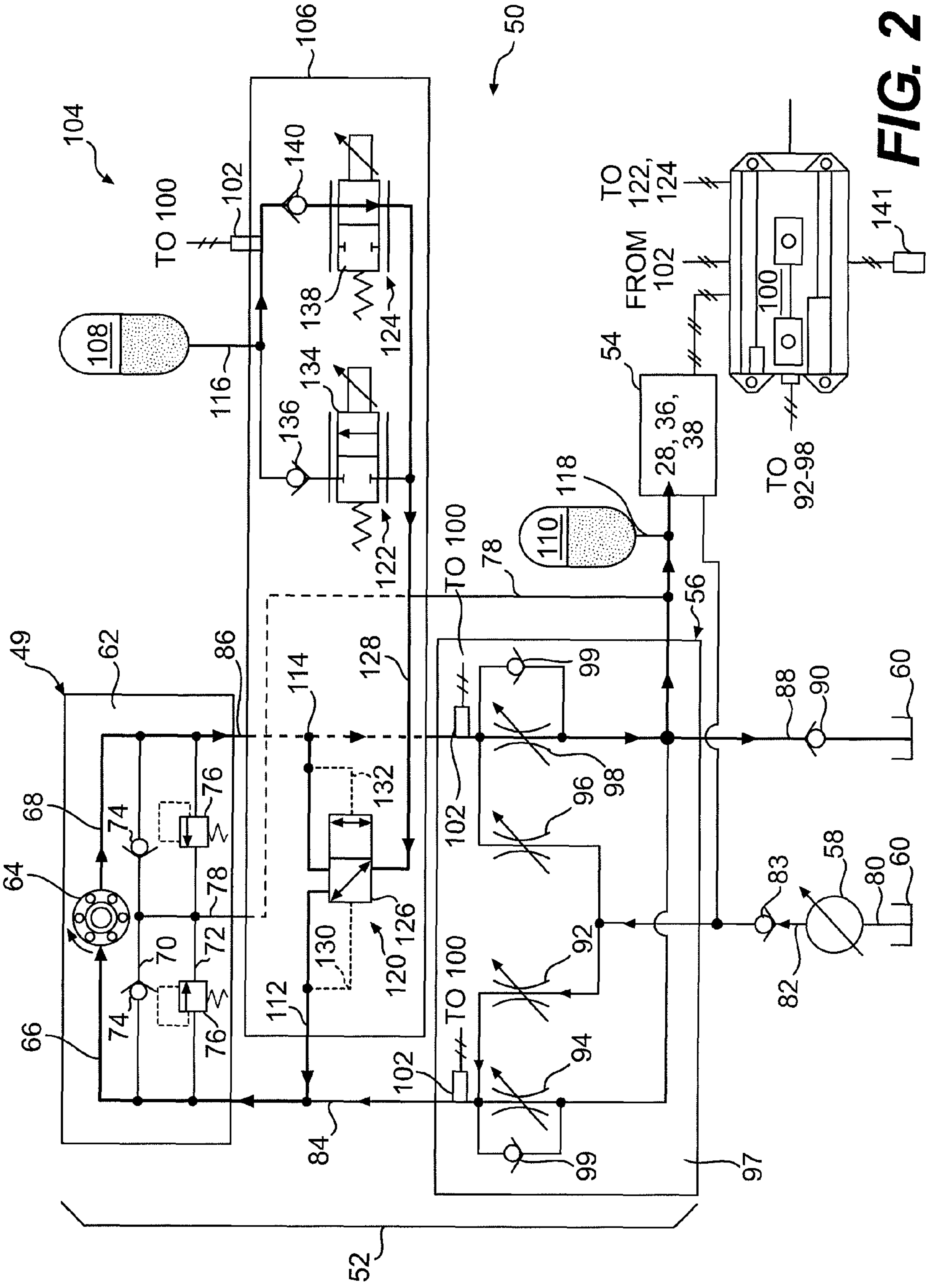
FIG. 2 is a schematic illustration of an exemplary disclosed hydraulic control system that may be used with the machine of FIG. 1.

As illustrated in FIG. 2, machine 10 may include a hydraulic control system 50 having a plurality of fluid components that cooperate to move implement system 14 (referring to FIG. 1). In particular, hydraulic control system 50 may include a first circuit 52 associated with swing motor 49, and at least a second circuit 54 associated with hydraulic cylinders 28, 36, and 38. First circuit 52 may include, among other things, a swing control valve 56 connected to regulate a flow of pressurized fluid from a pump 58 to swing motor 49 and from swing motor 49 to a low-pressure tank 60 to cause a swinging movement of work tool 16 about axis 46 (referring to FIG. 1) in accordance with an operator request received via input device 48. Second circuit 54 may include similar control valves, for example a boom control valve (not shown), a stick control valve (not shown), a tool control valve (not shown), a travel control valve (not shown), and/or an auxiliary control valve connected in parallel to receive pressurized fluid from pump 58 and to discharge waste fluid to tank 60, thereby regulating the corresponding actuators (e.g., hydraulic cylinders 28, 36, and 38).

Swing motor 49 may include a housing 62 at least partially forming a first and a second chamber (not shown) located to either side of an impeller 64. When the first chamber is connected to an output of pump 58 (e.g., via a first chamber passage 66 formed within housing 62) and the second chamber is connected to tank 60 (e.g., via a second chamber passage 68 formed within housing 62), impeller 64 may be driven to rotate in a first direction (shown in FIG. 2). Conversely, when the first chamber is connected to tank 60 via first chamber passage 66 and the second chamber is connected to pump 58 via second chamber passage 68, impeller 64 may be driven to rotate in an opposite direction (not shown). The flow rate of fluid through impeller 64 may relate to a rotational speed of swing motor 49, while a pressure differential across impeller 64 may relate to an output torque thereof.

Swing motor 49 may include built-in makeup and relief functionality. In particular, a makeup passage 70 and a relief passage 72 may be formed within housing 62, between first chamber passage 66 and second chamber passage 68. A pair of opposing check valves 74 and a pair of opposing relief valves 76 may be disposed within makeup and relief passages 70, 72, respectively. A low-pressure passage 78 may be connected to each of makeup and relief passages 70, 72 at locations between check valves 74 and between relief valves 76. Based on a pressure differential between low-pressure passage 78 and first and second chamber passages 66, 68, one of check valves 74 may open to allow fluid from low-pressure passage 78 into the lower-pressure one of the first and second chambers. Similarly, based on a pressure differential between first and second chamber passages 66, 68 and low-pressure passage 78, one of relief valves 76 may open to allow fluid from the higher-pressure one of the first and second chambers into low-pressure passage 78. A significant pressure differential may generally exist between the first and second chambers during a swinging movement of implement system 14.

Pump 58 may be configured to draw fluid from tank 60 via an inlet passage 80, pressurize the fluid to a desired level, and discharge the fluid to first and second circuits 52, 54 via a discharge passage 82. A check valve 83 may be disposed within discharge passage 82, if desired, to provide for a unidirectional flow of pressurized fluid from pump 58 into first and second circuits 52, 54. Pump 58 may embody, for example, a variable displacement pump (shown in FIG. 1), a fixed displacement pump, or another source known in the art. Pump 58 may be drivably connected to a power source (not shown) of machine 10 by, for example, a countershaft (not shown), a belt (not shown), an electrical circuit (not shown), or in another suitable manner. Alternatively, pump 58 may be indirectly connected to the power source of machine 10 via a torque converter, a reduction gear box, an electrical circuit, or in any other suitable manner. Pump 58 may produce a stream of pressurized fluid having a pressure level and/or a flow rate determined, at least in part, by demands of the actuators within first and second circuits 52, 54 that correspond with operator requested movements. Discharge passage 82 may be connected within first circuit 52 to first and second chamber passages 66, 68 via swing control valve 56 and first and second chamber conduits 84, 86, respectively, which extend between swing control valve 56 and swing motor 49.

Tank 60 may constitute a reservoir configured to hold a low-pressure supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 60. It is contemplated that hydraulic control system 50 may be connected to multiple separate fluid tanks or to a single tank, as desired. Tank 60 may be fluidly connected to swing control valve 56 via a drain passage 88, and to first and second chamber passages 66, 68 via swing control valve 56 and first and second chamber conduits 84, 86, respectively. Tank 60 may also be connected to low-pressure passage 78. A check valve 90 may be disposed within drain passage 88, if desired, to promote a unidirectional flow of fluid into tank 60.

Swing control valve 56 may have elements that are movable to control the rotation of swing motor 49 and corresponding swinging motion of implement system 14. Specifically, swing control valve 56 may include a first chamber supply element 92, a first chamber drain element 94, a second chamber supply element 96, and a second chamber drain element 98 all disposed within a common block or housing 97. The first and second chamber supply elements 92, 96 may be connected in parallel with discharge passage 82 to regulate filling of their respective chambers with fluid from pump 58, while the first and second chamber drain elements 94, 98 may be connected in parallel with drain passage 88 to regulate draining of the respective chambers of fluid. A makeup valve 99, for example a check valve, may be disposed between an outlet of first chamber drain element 94 and first chamber conduit 84 and between an outlet of second chamber drain element 98 and second chamber conduit 86.

To drive swing motor 49 to rotate in a first direction (shown in FIG. 2), first chamber supply element 92 may be shifted to allow pressurized fluid from pump 58 to enter the first chamber of swing motor 49 via discharge passage 82 and first chamber conduit 84, while second chamber drain element 98 may be shifted to allow fluid from the second chamber of swing motor 49 to drain to tank 60 via second chamber conduit 86 and drain passage 88. To drive swing motor 49 to rotate in the opposite direction, second chamber supply element 96 may be shifted to communicate the second chamber of swing motor 49 with pressurized fluid from pump 58, while first chamber drain element 94 may be shifted to allow draining of fluid from the first chamber of swing motor 49 to tank 60. It is contemplated that both the supply and drain functions of swing control valve 56 (i.e., of the four different supply and drain elements) may alternatively be performed by a single valve element associated with the first chamber and a single valve element associated with the second chamber or by a single valve element associated with both the first and second chambers, if desired.

Supply and drain elements 92-98 of swing control valve 56 may be solenoid-movable against a spring bias in response to a flow rate command issued by a controller 100. In particular, swing motor 49 may rotate at a velocity that corresponds with the flow rate of fluid into and out of the first and second chambers. Accordingly, to achieve an operator-desired swing velocity, a command based on an assumed or measured pressure may be sent to the solenoids (not shown) of supply and drain elements 92-98 that causes them to open an amount corresponding to the necessary flow rate through swing motor 49. This command may be in the form of a flow rate command or a valve element position command that is issued by controller 100.

Controller 100 may be in communication with the different components of hydraulic control system 50 to regulate operations of machine 10. For example, controller 100 may be in communication with the elements of swing control valve 56 in first circuit 52 and with the elements of control valves (not shown) associated with second circuit 54. Based on various operator input and monitored parameters, as will be described in more detail below, controller 100 may be configured to selectively activate the different control valves in a coordinated manner to efficiently carry out operator requested movements of implement system 14.

Controller 100 may include a memory, a secondary storage device, a clock, and one or more processors that cooperate to accomplish a task consistent with the present disclosure. Numerous commercially available microprocessors can be configured to perform the functions of controller 100. It should be appreciated that controller 100 could readily embody a general machine controller capable of controlling numerous other functions of machine 10. Various known circuits may be associated with controller 100, including signal-conditioning circuitry, communication circuitry, and other appropriate circuitry. It should also be appreciated that controller 100 may include one or more of an application-specific integrated circuit (ASIC), a field-programmable gate array (FPGA), a computer system, and a logic circuit configured to allow controller 100 to function in accordance with the present disclosure.

The operational parameters monitored by controller 100, in one embodiment, may include a pressure of fluid within first and/or second circuits 52, 54. For example, one or more pressure sensors 102 may be strategically located within first chamber and/or second chamber conduits 84, 86 to sense a pressure of the respective passages and generate a corresponding signal indicative of the pressure directed to controller 100. It is contemplated that any number of pressure sensors 102 may be placed in any location within first and/or second circuits 52, 54, as desired. It is further contemplated that other operational parameters such as, for example, speed, temperatures, viscosities, densities, etc. may also or alternatively be monitored and used to regulate operation of swing energy recovery system 50, if desired.

Hydraulic control system 50 may be fitted with an energy recovery arrangement 104 that is in communication with at least first circuit 52 and configured to selectively extract and recover energy from waste fluid that is discharged from swing motor 49. Energy recovery arrangement (ERA) 104 may include, among other things, a recovery valve block (RVB) 106 that is fluidly connectable between pump 58 and swing motor 49, a first accumulator 108 configured to selective communicate with swing motor 49 via RVB 106, and a second accumulator 110 also configured to selectively communicate with swing motor 49. In the disclosed embodiment, RVB 106 may be fixedly and mechanically connectable to one or both of swing control valve 56 and swing motor 49, for example directly to housing 62 and/or directly to housing 97. RVB 106 may include an internal first passage 112 fluidly connectable to first chamber conduit 84, and an internal second passage 114 fluidly connectable to second chamber conduit 86. First accumulator 108 may be fluidly connected to RVB 106 via a first accumulator passage or conduit 116, while second accumulator 110 may be fluidly connectable to drain passages 78 and 88, in parallel with tank 60, via a second accumulator passage or conduit 118.

RVB 106 may house a selector valve 120, a charge valve 122 associated with first accumulator 108, and a discharge valve 124 associated with first accumulator 108 and disposed in parallel with charge valve 122. Selector valve 120 may selectively fluidly communicate one of first and second passages 112, 114 with charge and discharge valves 122, 124 based on a pressure of first and second passages 112, 114. Charge and discharge valves 122, 124 may be movable in response to commands from controller 100 to selectively fluidly communicate first accumulator 108 with selector valve 120 for fluid charging and discharging purposes.

Selector valve 120 may be a pilot-operated, 2-position, 3-way valve that is movable in response to fluid pressure in first and second passages 112, 114 (i.e., in response to a fluid pressure within the first and second chambers of swing motor 49). In particular, selector valve 120 may include a valve element 126 that is movable from a first position (shown in FIG. 2) at which first passage 112 is fluidly connected to charge and discharge valves 122, 124 via an internal passage 128, toward a second position (not shown) at which second passage 114 is fluid connected to charge and discharge valves 122, 124 via passage 128. When first passage 112 is fluidly connected to charge and discharge valves 122, 124 via passage 128, fluid flow through second passage 114 may be inhibited by selector valve 120 and vice versa. First and second pilot passages 130, 132 may communicate fluid from first and second passages 112, 114 to opposing ends of valve element 126 such that a higher-pressure one of first or second passages 112, 114 may cause valve element 126 to move and fluidly connect the corresponding passage with charge and discharge valves 122, 124 via passage 128.

Charge valve 122 may be a solenoid-operated, variable position, 2-way valve that is movable in response to a command from controller 100 to allow fluid from passage 128 to enter first accumulator 108. In particular, charge valve 122 may include a valve element 134 that is movable from a first position (shown in FIG. 2) at which fluid flow from passage 128 into first accumulator 108 is inhibited, toward a second position (not shown) at which passage 128 is fluidly connected to first accumulator 108. When valve element 134 is away from the first position (i.e., in the second position or in another position between the first and second positions) and a fluid pressure within passage 128 exceeds a fluid pressure within first accumulator 108, fluid from passage 128 may fill (i.e., charge) first accumulator 108. Valve element 134 may be spring-biased toward the first position and movable in response to a command from controller 100 to any position between the first and second positions to thereby vary a flow rate of fluid from passage 128 into first accumulator 108. A check valve 136 may be disposed between charge valve 122 and first accumulator 108 to provide for a unidirectional flow of fluid into accumulator 108 via charge valve 122.

Discharge valve 124 may be substantially identical to charge valve 122 in composition, and movable in response to a command from controller 100 to allow fluid from first accumulator 108 to enter passage 128 (i.e., to discharge). In particular, discharge valve 124 may include a valve element 138 that is movable from a first position (not shown) at which fluid flow from first accumulator 108 into passage 128 is inhibited, toward a second position (shown in FIG. 2) at which first accumulator 108 is fluidly connected to passage 128. When valve element 138 is away from the first position (i.e., in the second position or in another position between the first and second positions) and a fluid pressure within first accumulator 108 exceeds a fluid pressure within passage 128, fluid from first accumulator 108 may flow into passage 128. Valve element 138 may be spring-biased toward the first position and movable in response to a command from controller 100 to any position between the first and second positions to thereby vary a flow rate of fluid from first accumulator 108 into passage 128. A check valve 140 may be disposed between first accumulator 108 and discharge valve 124 to provide for a unidirectional flow of fluid from accumulator 108 into passage 128 via discharge valve 124.

An additional pressure sensor 102 may be associated with first accumulator 108 and configured to generate signals indicative of a pressure of fluid within first accumulator 108, if desired. In the disclosed embodiment, the additional pressure sensor 102 may be disposed between first accumulator 108 and discharge valve 124. It is contemplated, however, that the additional pressure sensor 102 may alternatively be disposed between first accumulator 108 and charge valve 122 or directly connected to first accumulator 108, if desired. Signals from the additional pressure sensor 102 may be directed to controller 100 for use in regulating operation of charge and/or discharge valves 122, 124.

First and second accumulators 108, 110 may each embody pressure vessels filled with a compressible gas that are configured to store pressurized fluid for future use by swing motor 49. The compressible gas may include, for example, nitrogen, argon, helium, or another appropriate compressible gas. As fluid in communication with first and second accumulators 108, 110 exceeds predetermined pressures of first and second accumulators 108, 110, the fluid may flow into accumulators 108, 110. Because the gas therein is compressible, it may act like a spring and compress as the fluid flows into first and second accumulators 108, 110. When the pressure of the fluid within conduits 116, 118 drops below the predetermined pressures of first and second accumulators 108, 110, the compressed gas may expand and urge the fluid from within first and second accumulators 108, 110 to exit. It is contemplated that first and second accumulators 108, 110 may alternatively embody membrane/spring-biased or bladder types of accumulators, if desired.

In the disclosed embodiment, first accumulator 108 may be a larger (i.e., about 5-20 times larger) and higher-pressure (i.e., about 5-60 times higher-pressure) accumulator, as compared to second accumulator 110. Specifically, first accumulator 108 may be configured to accumulate up to about 50-100 L of fluid having a pressure in the range of about 260-300 bar, while second accumulator 110 may be configured to accumulate up to about 10 L of fluid having a pressure in the range of about 5-30 bar. In this configuration, first accumulator 108 may be used primarily to assist the motion of swing motor 49 and to improve machine efficiencies, while second accumulator may be used primarily as a makeup accumulator to help reduce a likelihood of voiding at swing motor 49. It is contemplated, however, that other volumes and pressures may be accommodated by first and/or second accumulators 108, 110, if desired.

Energy recovery arrangement 104 may be assembled together within a kit that can be retrofitted onto existing machines 10. In particular, the retrofit kit may include RVB 106 (including selector valve 120, charge valve 122, and discharge valve 124), first accumulator 108, second accumulator 110, conduits 116 and 118, pressure sensor 102, and various fasteners, wiring, and/or conduit (not shown) required to assemble these components between an existing swing motor 49, an existing swing control valve 56, an existing pump 58, an existing tank 60, and an existing controller 100. A method of retrofitting an existing machine 10 with the components of this kit will be described in more detail in the following section of this disclosure.

Controller 100 may be configured to selectively cause first accumulator 108 to charge and discharge, thereby improving performance of machine 10. In particular, a typical swinging motion of implement system 14 instituted by swing motor 49 may consist of a segment of time during which swing motor 49 is accelerating a swinging movement of implement system 14 and a segment of time during which swing motor 49 is decelerating the swinging movement of implement system 14. The acceleration segments may require significant energy from swing motor 49 that is conventionally provided by way of pressurized fluid supplied to swing motor 49 by pump 58, while the deceleration segments may produce significant energy in the form of pressurized fluid that is conventionally wasted through discharge to tank 53. If the fluid passing through swing motor 49 is selectively collected within first accumulator 108 during the deceleration segment, this energy can then be returned to (i.e., discharged) and reused by swing motor 49 during the ensuing acceleration segment. Swing motor 49 can be assisted during the acceleration segment by selectively causing first accumulator 108 to discharge pressurized fluid into the higher-pressure chamber of swing motor 49 (via discharge valve 124, passage 128, selector valve 120, and the appropriate one of first and second chamber conduits 84, 86), alone or together with high-pressure fluid from pump 58, thereby propelling swing motor 49 at the same or greater rate with less pump power than otherwise possible via pump 58 alone. Swing motor 49 can be assisted during the deceleration segment by selectively causing first accumulator 108 to charge with fluid exiting swing motor 49, thereby providing additional resistance to the motion of swing motor 49 and lowering a restriction and cooling requirement of the fluid exiting swing motor 49.

In an alternative embodiment, controller 100 may be configured to selectively control charging of first accumulator 108 with fluid exiting pump 58, as opposed to fluid exiting swing motor 49. That is, during a peak-shaving or economy mode of operation, controller 100 may be configured to cause accumulator 108 to charge with fluid exiting pump 58 (e.g., via control valve 56, the appropriate one of first and second chamber conduits 84, 86, selector valve 126, passage 128, and charge valve 122) when pump 58 has excess capacity (i.e., a capacity greater than required by swing motor 49 to complete a current swing of work tool 16 requested by the operator). Then, during times when pump 58 has insufficient capacity to adequately power swing motor 49, the high-pressure fluid previously collected from pump 58 within first accumulator 108 may be discharged in the manner described above to assist swing motor 49.

Controller 100 may be configured to regulate the charging and discharging of first accumulator 108 based on a current or ongoing segment of the excavation work cycle of machine 10. In particular, based on input received from one or more performance sensors 141, controller 100 may be configured to partition a typical work cycle performed by machine 10 into a plurality of segments, for example, into a dig segment, a swing-to-dump acceleration segment, a swing-to-dump deceleration segment, a dump segment, a swing-to-dig acceleration segment, and a swing-to-dig deceleration segment, as will be described in more detail below. Based on the segment of the excavation work cycle currently being performed, controller 100 may selectively cause first accumulator 108 to charge or discharge, thereby assisting swing motor 49 during the acceleration and deceleration segments.

One or more maps relating signals from sensor(s) 141 to the different segments of the excavation work cycle may be stored within the memory of controller 100. Each of these maps may include a collection of data in the form of tables, graphs, and/or equations. In one example, threshold speeds, cylinder pressures, and/or operator input (i.e., lever positions) associated with the start and/or end of one or more of the segments may be stored within the maps. In another example, threshold forces and/or actuator positions associated with the start and/or end of one or more of the segments may be stored within the maps. Controller 100 may be configured to reference the signals from sensor(s) 141 with the maps stored in memory to determine the segment of the excavation work cycle currently being executed, and then regulate the charging and discharging of first accumulator 108 accordingly. Controller 100 may allow the operator of machine 10 to directly modify these maps and/or to select specific maps from available relationship maps stored in the memory of controller 100 to affect segment partitioning and accumulator control, as desired. It is contemplated that the maps may additionally or alternatively be automatically selectable based on modes of machine operation, if desired.

Sensor(s) 141 may be associated with the generally horizontal swinging motion of work tool 16 imparted by swing motor 49 (i.e., the motion of frame 42 relative to undercarriage member 44). For example, sensor 141 may embody a rotational position or speed sensor associated with the operation of swing motor 49, an angular position or speed sensor associated with the pivot connection between frame 42 and undercarriage member 44, a local or global coordinate position or speed sensor associated with any linkage member connecting work tool 16 to undercarriage member 44 or with work tool 16 itself, a displacement sensor associated with movement of operator input device 48, or any other type of sensor known in the art that may generate a signal indicative of a swing position, speed, force, or other swing-related parameter of machine 10. The signal generated by sensor(s) 141 may be sent to and recorded by controller 100 during each excavation cycle. It is contemplated that controller 100 may derive a swing speed based on a position signal from sensor 141 and an elapsed period of time, if desired.

Alternatively or additionally, sensor(s) 141 may be associated with the vertical pivoting motion of work tool 16 imparted by hydraulic cylinders 28 (i.e., associated with the lifting and lowering motions of boom 24 relative to frame 42). Specifically, sensor 141 may be an angular position or speed sensor associated with a pivot joint between boom 24 and frame 42, a displacement sensor associated with hydraulic cylinders 28, a local or global coordinate position or speed sensor associated with any linkage member connecting work tool 16 to frame 42 or with work tool 16 itself, a displacement sensor associated with movement of operator input device 48, or any other type of sensor known in the art that may generate a signal indicative of a pivoting position or speed of boom 24. It is contemplated that controller 100 may derive a pivot speed based on a position signal from sensor 141 and an elapsed period of time, if desired.

In yet an additional embodiment, sensor(s) 141 may be associated with the tilting force of work tool 16 imparted by hydraulic cylinder 38. Specifically, sensor 141 may be a pressure sensor associated with one or more chambers within hydraulic cylinder 38 or any other type of sensor known in the art that may generate a signal indicative of a tilting force of machine 10 generated during a dig and dump operation of work tool 16.

Figure 3:
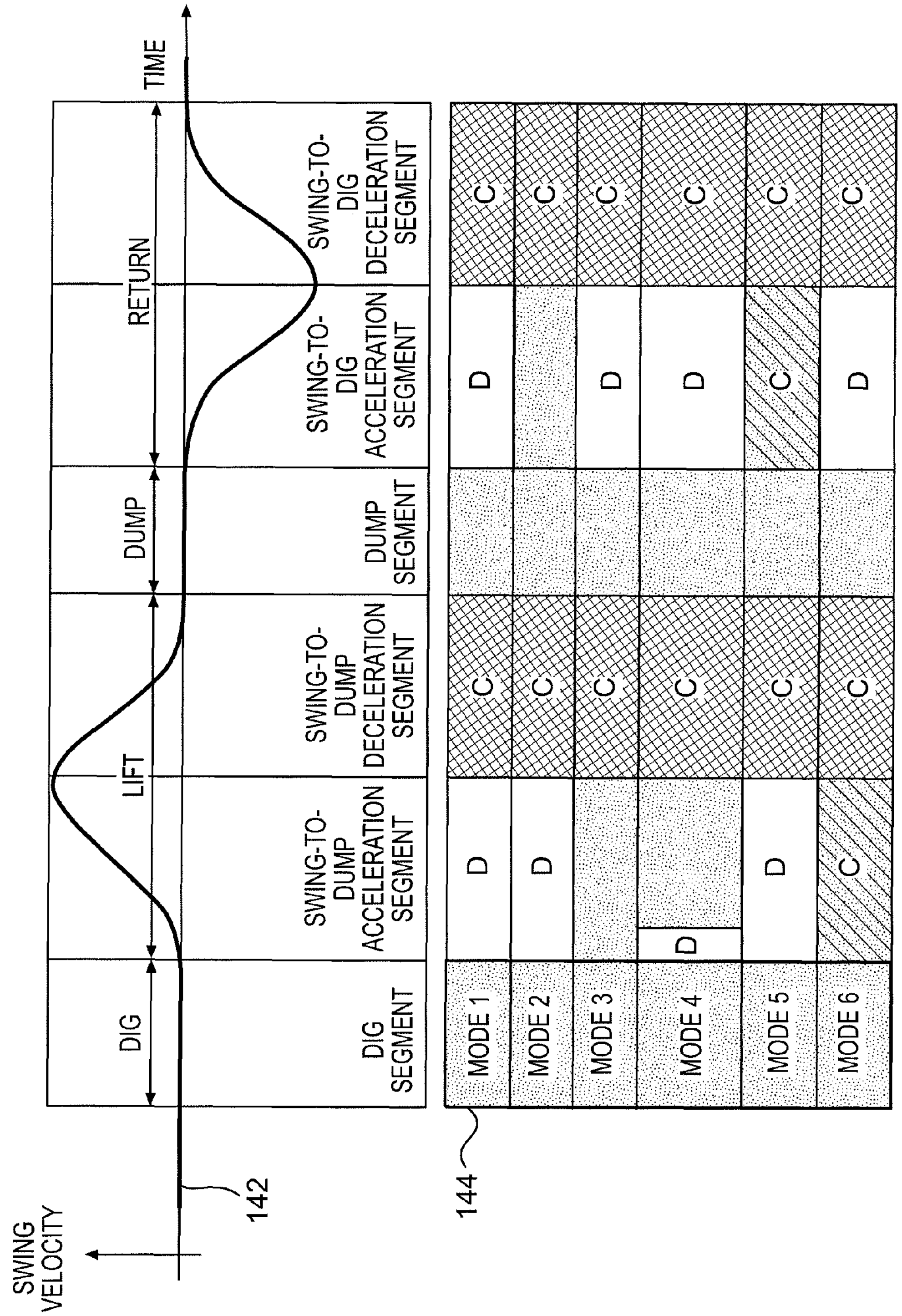
FIG. 3 is an exemplary disclosed control map that may be used by the hydraulic control system of FIG. 2.

With reference to FIG. 3, an exemplary curve 142 may represent a swing speed signal generated by sensor(s) 141 relative to time throughout each segment of the excavation work cycle, for example throughout a work cycle associated with 90° truck loading. During most of the dig segment, the swing speed may typically be about zero (i.e., machine 10 may generally not swing during a digging operation). At completion of a dig stroke, machine 10 may generally be controlled to swing work tool 16 toward the waiting haul vehicle 12 (referring to FIG. 1). As such, the swing speed of machine 10 may begin to increase toward the end of the dig segment. As the swing-to-dump segment of the excavation work cycle progresses, the swing speed may accelerate to a maximum when work tool 16 is about midway between dig location 18 and dump location 20, and then decelerate toward the end of the swing-to-dump segment. During most of the dump segment, the swing speed may typically be about zero (i.e., machine 10 may generally not swing during a dumping operation). When dumping is complete, machine 10 may generally be controlled to swing work tool 16 back toward dig location 18 (referring to FIG. 1). As such, the swing speed of machine 10 may increase toward the end of the dump segment. As the swing-to-dig segment of the excavation cycle progresses, the swing speed may accelerate to a maximum in a direction opposite to the swing direction during the swing-to-dump segment of the excavation cycle. This maximum speed may generally be achieved when work tool 16 is about midway between dump location 20 and dig location 18. The swing speed of work tool 16 may then decelerate toward the end of the swing-to-dig segment, as work tool 16 nears dig location 18. Controller 100 may partition a current excavation work cycle into the six segments described above based on signals received from sensor(s) 141 and the maps stored in memory, based on swing speeds, tilt forces, and/or operator input recorded for a previous excavation work cycle, or in any other manner known in the art.

Controller 100 may selectively cause first accumulator 108 to charge and to discharge based on the current or ongoing segment of the excavation work cycle. For example, a chart portion 144 (i.e., the lower portion) of FIG. 3 illustrates 6 different modes of operations during which the excavation cycle can be completed, together with an indication as to when first accumulator 108 is controlled to charge with pressurized fluid (represented by "C") or to discharge pressurized fluid (represented by "D") relative the segments of each excavation work cycle. First accumulator 108 can be controlled to charge with pressurized fluid by moving valve element 134 of charge valve to the second or flow-passing position when the pressure within passage 128 is greater than the pressure within first accumulator 108. First accumulator 108 can be controlled to discharge pressurized fluid by moving valve element 138 to the second or flow-passing position when the pressure within first accumulator 108 is greater than the pressure within passage 128.

Based on the chart of FIG. 3, some general observations may be made. First, it can be seen that controller 100 may inhibit first accumulator 108 from receiving or discharging fluid during the dig and dump segments of all of the modes of operation (i.e., controller 100 may maintain valve elements 134 and 138 in the flow-blocking first positions during the dig and dump segments). Controller 100 may inhibit charging and discharging during the dig and dump segments, as no or little swinging motion is required during completion of these portions of the excavation work cycle. Second, the number of segments during which controller 100 causes first accumulator 108 to receive fluid may be greater than the number of segments during which controller 100 causes first accumulator 108 to discharge fluid for a majority of the modes (e.g., for modes 2-6). Controller 100 may generally cause first accumulator 108 to charge more often than discharge, because the amount of charge energy available at a sufficiently high pressure (i.e., at a pressure greater than the threshold pressure of first accumulator 108) may be less than an amount of energy required during movement of implement system 14. Third, the number of segments during which controller 100 causes first accumulator 108 to discharge fluid may never be greater than the number of segments during which controller 100 causes first accumulator 108 to receive fluid for all modes. Fourth, controller 100 may cause first accumulator 108 to discharge fluid during only a swing-to-dig or a swing-to-dump acceleration segment for all modes. Discharge during any other segment of the excavation cycle may only serve to reduce machine efficiency. Fifth, controller 100 may cause first accumulator 108 to receive fluid during only a swing-to-dig or swing-to-dump deceleration segment for a majority of the modes of operation (e.g., for modes 1-4).

Mode 1 may correspond with a swing-intensive operation where a significant amount of swing energy is available for storage by first accumulator 108. An exemplary swing-intensive operation may include a 180° (or greater) swing operation, such as the truck loading example shown in FIG. 1, material handling (e.g., using a grapple or magnet), hopper feeding from a nearby pile, or another operation where an operator of machine 10 typically requests harsh stop-and-go commands. When operating in mode 1, controller 100 may be configured to cause first accumulator 108 to discharge fluid to swing motor 49 during the swing-to-dump acceleration segment, receive fluid from swing motor 49 during the swing-to-dump deceleration segment, discharge fluid to swing motor 49 during the swing-to-dig acceleration segment, and receive fluid from swing motor 49 during the swing-to-dig deceleration segment.

Controller 100 may be instructed by the operator of machine 10 that the first mode of operation is currently in effect (e.g., that truck loading is being performed) or, alternatively, controller 100 may automatically recognize operation in the first mode based on performance of machine 10 monitored via sensor(s) 141. For example, controller 100 could monitor swing angle of implement system 14 between stopping positions (i.e., between dig and dump locations 18, 20) and, when the swing angle is repeatedly greater than a threshold angle, for instance greater than about 150°, controller 100 may determine that the first mode of operation is in effect. In another example, manipulation of input device 48 could be monitored via sensor(s) 141 to detect "harsh" inputs indicative of mode 1 operation. In particular, if the input is repeatedly moved from below a low threshold (e.g., about 10% lever command) to above a high threshold level (e.g., about 100% lever command) within a short amount of time (e.g., about 0.2 sec or less), input device 48 may be considered to be manipulated in a harsh manner, and controller 100 may responsively determine that the first mode of operation is in effect. In a final example, controller 100 may determine that the first mode of operation is in effect based on a cycle and/or value of pressures within accumulator 100, for example when a threshold pressure is repetitively reached. In this final example, the threshold pressure may be about 75% of a maximum pressure.

Modes 2-4 may correspond generally with swing operations where only a limited amount of swing energy is available for storage by first accumulator 108. Exemplary swing operations having a limited amount of energy may include 90° truck loading, 45° trenching, tamping, or slow and smooth craning. During these operations, fluid energy may need to be accumulated from two or more segments of the excavation work cycle before significant discharge of the accumulated energy is possible. It should be noted that, although mode 4 is shown as allowing two segments of discharge from first accumulator 108, one of the segments (e.g., the swing-to-dump segment) may only allow for a partial discharge of accumulated energy. As with mode 1 described above, modes 2-4 may be triggered manually by an operator of machine 10 or, alternatively, automatically triggered based on performance of machine 10 as monitored via sensor(s) 141. For example, when machine 10 is determined to be repeatedly swinging through an angle less than about 100°, controller 100 may determine that one of modes 2-4 is in effect. In another example, controller 100 may determine that modes 2-4 are in effect based on operator requested boom movement less than a threshold amount (e.g., less than about 80% lever command for mode 2 or 4), and/or work tool tilting less than a threshold amount (e.g., less than about 80% lever command for mode 3 or 4).

During mode 2, controller 100 may cause first accumulator 108 to discharge fluid to swing motor 49 during only the swing-to-dump acceleration segment, receive fluid from swing motor 49 during the swing-to-dump deceleration segment, and receive fluid from swing motor 49 during the swing-to-dig deceleration segment. During mode 3, controller 100 may cause first accumulator 108 to receive fluid from swing motor 49 during the swing-to-dump deceleration segment, discharge fluid to swing motor 49 during only the swing-to-dig acceleration segment, and receive fluid from swing motor 49 during the swing-to-dig deceleration segment. During mode 4, controller 100 may cause first accumulator 108 to discharge only a portion of previously-recovered fluid to swing motor 49 during the swing-to-dump acceleration segment, receive fluid from swing motor 49 during the swing-to-dump deceleration segment, discharge fluid to swing motor 49 during the swing-to-dig acceleration segment, and receive fluid from swing motor 49 during the swing-to-dig deceleration segment.

Modes 5 and 6 may be known as economy or peak-shaving modes, where excess fluid energy during one segment of the excavation work cycle is generated by pump 58 (fluid energy in excess of an amount required to adequately drive swing motor 49 according to operator requests) and stored for use during another segment when less than adequate fluid energy may be available for a desired swinging operation. During these modes of operation, controller 100 may cause first accumulator 108 to charge with pressurized fluid from pump 58 during a swing acceleration segment, for example during the swing-to-dump or swing-to-dig acceleration segments, when the excess fluid energy is available. Controller 100 may then cause first accumulator 108 to discharge the accumulated fluid during another acceleration segment when less than adequate energy is available. Specifically, during mode 5, controller 100 may cause first accumulator 108 to discharge fluid to swing motor 49 during only the swing-to-dump acceleration segment, receive fluid from swing motor 49 during the swing-to-dump deceleration segment, receive fluid from pump 58 during the swing-to-dig acceleration segment, and receive fluid from swing motor 49 during the swing-to-dig deceleration segment, for a total of three charging segments and one discharging segment. During mode 6, controller 100 may cause first accumulator 108 to receive fluid from pump 58 during the swing-to-dump acceleration segment, receive fluid from swing motor 49 during the swing-to-dump deceleration segment, discharge fluid to swing motor 49 during the swing-to-dig acceleration segment, and receive fluid from swing motor 49 during the swing-to-dig deceleration segment.

It should be noted that controller 100 may be limited during the charging and discharging of first accumulator 108 by fluid pressures within first chamber conduit 84, second chamber conduit 86, and first accumulator 108. That is, even though a particular segment in the work cycle of machine 10 during a particular mode of operation may call for charging or discharging of first accumulator 108, controller 100 may only be allowed to implement the action when the related pressures have corresponding values. For example, if sensors 102 indicate that a pressure of fluid within first accumulator 108 is below a pressure of fluid within first chamber conduit 84, controller 100 may not be allowed to initiate discharge of first accumulator 108 into first chamber conduit 84. Similarly, if sensors 102 indicate that a pressure of fluid within second chamber conduit 86 is less than a pressure of fluid within first accumulator 108, controller 100 may not be allowed to initiate charging of first accumulator 108 with fluid from second chamber conduit 86. Not only could the exemplary processes be impossible to implement at particular times when the related pressures are inappropriate, but an attempt to implement the processes could result in undesired machine performance.

During the discharging of pressurized fluid from first accumulator 108 to swing motor 49, the fluid exiting swing motor 49 may still have an elevated pressure that, if allowed to drain into tank 60, may be wasted. At this time, second accumulator 110 may be configured to charge with fluid exiting swing motor 49 any time that first accumulator 108 is discharging fluid to swing motor 49. In addition, during the charging of first accumulator 108, it may be possible for swing motor 49 to receive too little fluid from pump 58 and, unless otherwise accounted for, the insufficient supply of fluid from pump 58 to swing motor 49 under these conditions could cause swing motor 49 to cavitate. Accordingly, second accumulator 110 may be configured to discharge to swing motor 49 any time that first accumulator 108 is charging with fluid from swing motor 49.

As described above, second accumulator 110 may discharge fluid any time a pressure within drain passage 78 falls below the pressure of fluid within second accumulator 110. Accordingly, the discharge of fluid from second accumulator 110 into first circuit 52 may not be directly regulated via controller 100. However, because second accumulator 110 may charge with fluid from first circuit 52 whenever the pressure within drain passage 88 exceeds the pressure of fluid within second accumulator 110, and because control valve 56 may affect the pressure within drain passage 88, controller 100 may have some control over the charging of second accumulator 110 with fluid from first circuit 52 via control valve 56.

In some situations, it may be possible for both first and second accumulators 108, 110 to simultaneously charge with pressurized fluid. These situations may correspond, for example, with operation in the peak-shaving modes (i.e., in modes 5 and 6.). In particular, it may be possible for second accumulator 110 to simultaneously charge with pressurized fluid when pump 58 is providing pressurized fluid to both swing motor 49 and to first accumulator 108 (e.g., during the swing-to-dig acceleration segment of mode 5 and/or during the swing-to-dump acceleration segment of mode 6). At these times, the fluid exiting pump 58 may be directed into first accumulator 108, while the fluid exiting swing motor 49 may be directed into second accumulator 110.

Second accumulator 110 may also be charged via second circuit 54 when conditions allow, if desired. In particular, any time waste fluid from second circuit 54 (i.e., fluid draining from second circuit 54 to tank 60) has a pressure greater than the threshold pressure of second accumulator 110, the waste fluid may be collected within second accumulator 110. In a similar manner, pressurized fluid within second accumulator 110 may be selectively discharged into second circuit 54 when the pressure within second circuit 54 falls below the pressure of fluid collected within second accumulator 110.

INDUSTRIAL APPLICABILITY

The disclosed hydraulic control system may be applicable to any excavation machine that performs a substantially repetitive work cycle, which involves swinging movements of a work tool. The disclosed hydraulic control system may help to improve machine performance and efficiency by assisting swinging acceleration and deceleration of the work tool during different segments of the work cycle based on a current mode of operation. Specifically, the disclosed hydraulic control system may partition the work cycle into segments and, based on the current mode of operation, selectively store pressurized waste fluid or release the stored fluid to assist movement of a swing motor during the partitioned segments. Although applicable to new machines, the disclosed hydraulic control system may include an energy recovery kit that can also be retrofitted to existing machines. Accordingly, a method of retrofitting an existing hydraulic control system with the disclosed energy recovery kit will now be described with reference to FIG. 2.

The method of retrofitting an existing hydraulic control system with an energy recovery kit may include a step of disconnecting an existing motor of the hydraulic control system from an existing control valve block. The method may also include connecting RVB 106 to the existing control valve block, and then connecting the existing motor to RVB 106. Connecting RVB 106 to the existing control valve block and connecting the existing motor to RVB 106 may include fluidly connecting first and second internal passages of RVB 106 to first and second chamber passages of the existing control valve block and motor, respectively. Connecting RVB 106 to the existing control valve block and connecting the existing motor to RVB 106 may also include, in some embodiments, mechanically connecting these components directly to each other.

The method of retrofitting may also include mechanically and fluidly connecting first accumulator 108 to RVB 106 via conduit 116, and fluidly connecting second accumulator 110 to an existing return line of the existing motor via conduit 118. In this arrangement, selector valve 120 may be fluidly connected between the existing first and second chamber passages of the existing motor and first accumulator 108, and charge and discharge valves 122, 124 may be fluidly connected between first accumulator 108 and selector valve 120.

Several benefits may be associated with the disclosed hydraulic control system. First, because hydraulic control system 50 may utilize a high-pressure accumulator and a low-pressure accumulator (i.e., first and second accumulators 108, 110), fluid discharged from swing motor 49 during acceleration segments of the excavation work cycle may be recovered within second accumulator 110. This double recovery of energy may help to increase the efficiency of machine 10. Second, the use of second accumulator 110 may help to reduce the likelihood of voiding at swing motor 49. Third, the ability to adjust accumulator charging and discharging based on a current segment of the excavation work cycle and/or based on a current mode of operation, may allow hydraulic control system 50 to tailor swing performance of machine 10 for particular applications, thereby enhancing machine performance and/or further improving machine efficiency.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. An energy recovery retrofit kit for a hydraulic system, comprising:
- a first accumulator;
- a second accumulator; and
- a recovery valve block fluidly connectable between an existing pump and an existing motor of the hydraulic system, the recovery valve block including:
  - a housing at least partially defining a first internal passage fluidly connectable with the existing motor and the existing pump, a second internal passage fluidly connectable with the existing motor and the existing pump, and a first accumulator passage fluidly connectable with the first accumulator; and
  - a selector valve disposed within the housing and movable to selectively connect a higher-pressure one of the first and second internal passages and with the first accumulator passage.

2. The energy recover retrofit kit of claim 1, wherein the selector valve is a pilot-operated valve.

3. The energy recover retrofit kit of claim 1, further including at least one accumulator valve disposed within the first accumulator passage between the selector valve and the first accumulator.

4. The energy recovery retrofit kit of claim 3, wherein the at least one accumulator valve includes:
- a discharge valve; and
- a charge valve disposed in parallel with the discharge valve.

5. The energy recovery retrofit kit of claim 4, further including:
- a first check valve associated with the discharge valve; and
- a second check valve associated with the charge valve.

6. The energy recovery retrofit kit of claim 4, wherein the discharge and charge valves are solenoid-operated and spring-biased.

7. The energy recovery retrofit kit of claim 4, further including a second accumulator passage connectable between an existing makeup valve of the existing motor and the second accumulator.

8. The energy recovery retrofit kit of claim 7, wherein, the second accumulator passage is fluidly connectable between the second accumulator and an existing drain passage of the hydraulic system.

9. The energy recovery retrofit kit of claim 7, further including a conduit fluidly connectable between the first accumulator and the first accumulator passage of the recovery valve block.

10. The energy recover retrofit kit of claim 1, wherein:
- the hydraulic system includes an existing control valve block that controls fluid flow between the existing pump and motor; and
- the recovery valve block is directly mountable to at least one of the existing control valve block and the existing motor.

11. The energy recover retrofit kit of claim 1, wherein the first accumulator has a volume about 5-20 times greater than a volume of the second accumulator.

12. The energy recover retrofit kit of claim 1, wherein the first accumulator has a pressure range about 5-60 times greater than a pressure range of the second accumulator.

13. An energy recovery retrofit kit, comprising:
- a high-pressure accumulator;
- a low-pressure accumulator; and
- a recovery valve block fluidly and mechanically connectable to an existing control valve block, between an existing pump and an existing motor of the hydraulic system, the recovery valve block including:
  - a housing at least partially defining a first internal passage fluidly connectable with the existing motor and the existing pump, a second internal passage fluidly connectable with the existing motor and the existing pump, a first accumulator passage fluidly connectable with the first accumulator, and a second accumulator passage connectable between a makeup valve of the existing motor and the second accumulator;
  - a selector valve disposed within the housing and movable to selectively connect a higher pressure one of the first and second internal passages with the first accumulator passage; and
  - at least one accumulator valve disposed within the first accumulator passage between the selector valve and the first accumulator.

* * * * *